US012436784B2

(12) United States Patent
Iwayama (10) Patent No.: US 12,436,784 B2
(45) Date of Patent: Oct. 7, 2025

(54) INFORMATION PROCESSING APPARATUS USING PROGRAM COOPERATION, CONTROL METHOD THEREFOR, AND STORAGE MEDIUM STORING CONTROL PROGRAM THEREFOR

(71) Applicant: Canon Kabushiki Kaisha, Tokyo (JP)

(72) Inventor: Hiroyoshi Iwayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 18/350,786

(22) Filed: Jul. 12, 2023

(65) Prior Publication Data
US 2024/0053997 A1 Feb. 15, 2024

(30) Foreign Application Priority Data
Aug. 9, 2022 (JP) ................................. 2022-127256

(51) Int. Cl.
  *G06F 3/0482* (2013.01)
  *G06F 3/04817* (2022.01)
  *G06F 3/04847* (2022.01)
  *G06F 9/451* (2018.01)
  *H04M 1/72403* (2021.01)

(52) U.S. Cl.
  CPC .......... *G06F 9/454* (2018.02); *G06F 3/04817* (2013.01); *G06F 3/0482* (2013.01); *G06F 3/04847* (2013.01); *H04M 1/72403* (2021.01); H04M 2250/58 (2013.01)

(58) Field of Classification Search
  CPC ............... G06F 3/04817; G06F 3/0482; G06F 3/04847; G06F 9/454; H04M 1/72403
  See application file for complete search history.

(56) References Cited

U.S. PATENT DOCUMENTS

2010/0228537 A1* 9/2010 Kim .................. G06F 9/454
  715/764
2013/0013286 A1* 1/2013 Rodet .................... G06F 40/58
  704/8

(Continued)

FOREIGN PATENT DOCUMENTS

| JP | H10-275071 A | 10/1998 |
| JP | 2016-018285 A | 2/2016 |
| JP | 2017-010089 A | 1/2017 |

*Primary Examiner* — Seth A Silverman
(74) *Attorney, Agent, or Firm* — Venable LLP (57) ABSTRACT

An information processing apparatus that can eliminate strangeness given to a user due to mismatch of display languages of applications in changing an application screen during application cooperation. The information processing apparatus allows change of a language setting for each application after its installation. The information processing apparatus includes a request acceptor that accepts an activation request for a second application on a first application that has already installed in the information processing apparatus, a storing unit that stores a language setting of the first application into an information sharing area that is available during operations of both the first and second applications, and a change unit that obtains the language setting of the first application from the information sharing area and changes a language setting of the second application to the obtained language setting of the first application in activating the second application in response to the activation request.

18 Claims, 8 Drawing Sheets

(56) References Cited

U.S. PATENT DOCUMENTS

2015/0248649 A1\* 9/2015 Avats ................ G06Q 10/1053
705/321
2020/0112595 A1\* 4/2020 Ruetschi ............. H04M 7/0027

\* cited by examiner

INFORMATION PROCESSING APPARATUS USING PROGRAM COOPERATION, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus in which program cooperation is used, a control method therefor, and a storage medium storing a control program therefor.

Description of the Related Art

Conventionally, information processing apparatuses, such as a mobile terminal and a smartphone, generally use program cooperation in which programs, such as installed applications, operate in cooperation with each other. Specifically, the program cooperation is, for example, a technique that enables to execute a process based on information handled to a predetermined program by a program different from the predetermined program.

Japanese Laid-Open Patent Publication (Kokai) No. 2016-18285 (JP 2016-18285A) discloses a technique for sharing information between a first application and a second application by adding a parameter like a print setting to a URL scheme in activating the second application from the first application using the URL scheme. Hereinafter, this technique is referred to as application cooperation.

Japanese Laid-Open Patent Publication (Kokai) No. 2017-10089 (JP 2017-10089A) discloses a method for suppressing strangeness felt about screen display when an application different from an application activated by a user is activated in the application cooperation. In this way, when a plurality of applications are activated by the application cooperation, it is important to perform seamless cooperative operation and display as if a single application is operating in order to improve usability.

In the meantime, in recent years, a language displayed in an application operating on a smartphone is not a language set in an OS (referred to as an OS setting language), but can be set individually for each application (referred to as an application setting language). Such a difference between the OS setting language and the application setting language may cause problems, such as garbled characters, in the display of the program. Japanese Laid-Open Patent Publication (Kokai) No. H10-275071 (JP 1998-275071A) discloses a technique for eliminating such a difference in display language.

However, when the application cooperation is performed between applications of which setting languages are different, a display language is changed in changing a screen to an application to be cooperatively activated, which gives strangeness to a user.

SUMMARY OF THE INVENTION

The present invention provides an information processing apparatus, a control method thereof, and a storage medium storing a control program thereof, which can eliminate strangeness given to a user due to mismatch of display languages of applications in changing an application screen during application cooperation.

Accordingly, an aspect of the present invention provides an information processing apparatus in which a language setting for each application can be changed after its installation, the information processing apparatus including a request acceptor configured to accept an activation request for a second application on a first application that has already installed in the information processing apparatus, a storing unit configured to store a language setting of the first application into an information sharing area that is available during operations of both the first and second applications, and a change unit configured to obtain the language setting of the first application from the information sharing area and to change a language setting of the second application to the obtained language setting of the first application in activating the second application in response to the activation request.

According to the present invention, when the application cooperation is performed, it is possible to eliminate the strangeness given to a user due to mismatch of display languages of applications in changing an application screen during application cooperation.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings. It should be noted that each of the following embodiments does not limit the present invention according to the claims, and all of the combinations of features described in each of the embodiments are not necessarily essential to the solution of the present invention.

An information processing apparatus according to a first embodiment of the present invention will be described. Although a mobile terminal 100 is exemplified as an information processing apparatus in this embodiment, various apparatuses in which a program can be installed can be used as the information processing apparatus according to the present invention. For example, a notebook PC, a tablet terminal, a personal digital assistant (PDA), a digital camera, a music playback device, a television, or the like can be used as the information processing apparatus according to the present invention. In this embodiment, a smartphone is exemplified as the mobile terminal 100. The smartphone is a multifunctional mobile phone equipped with a camera function, an Internet browser function, an e-mail function, and the like in addition to a mobile phone function.

Figure 1A:
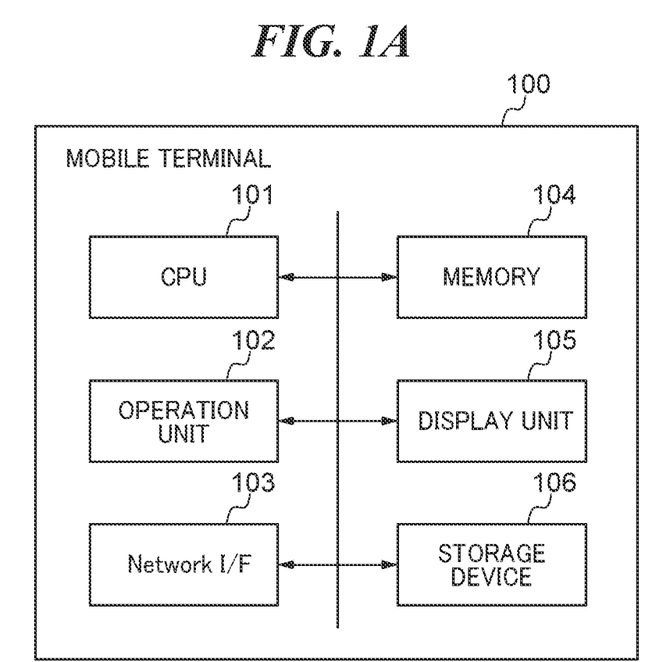
FIG. 1A and FIG. 1B are block diagrams showing a hardware configuration and a software configuration of a mobile terminal as an information processing apparatus according to a first embodiment of the present invention.
Figure 1B:
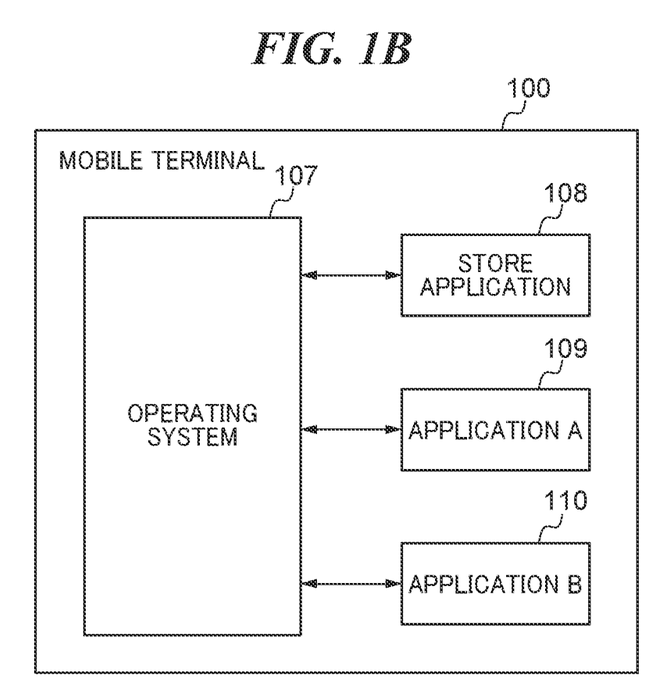

FIG. 1A and FIG. 1B are block diagrams showing configurations of the mobile terminal 100. FIG. 1A shows a hardware configuration of the mobile terminal 100, and FIG. 1B shows a software configuration of the mobile terminal 100.

The mobile terminal 100 includes a CPU 101, an operation unit 102, a network interface 103, a memory 104, a display unit 105, and a storage device 106, which are mutually connected via a system bus.

The CPU 101 totally controls the mobile terminal 100. The operation unit 102 is used when a user gives an instruction to the mobile terminal 100, and includes buttons, a touch panel, etc.

The memory 104 is a random access memory (RAM) used as a working area for the CPU 101, is used as a temporary storage area for various received data, and stores various configuration data.

The storage device 106 is, for example, a flash memory or the like, and stores various control programs, such as applications, an operating system (hereinafter referred to as an OS), etc.

The network interface 103 is an interface for connecting to a network (not shown). The mobile terminal 100 is connectable to the network via the network interface 103, and is configured to be connectable to an external device like a printer and the Internet via the network.

The display unit 105 is a unit for displaying various kinds of information, and consists of a liquid crystal panel or the like. It should be noted that the operation unit 102 and the display unit 105 are integrally configured in this embodiment, and can receive a user operation and can display various kinds of information. That is, the operation unit 102 and the display unit 105 shall be configured by a touch display. The user can give various instructions to the mobile terminal 100 to operate the mobile terminal 100 by tracing or tapping the touch display with a finger. The user can give various instructions to the mobile terminal 100 also by operating the touch display with an operator other than a finger, for example, an electrostatic touch panel pen such as a stylus pen. It should be noted that the operation unit 102 and the display unit 105 may not be integrally configured. For example, the operation unit 102 may be a physical keyboard including physical keys.

As shown in FIG. 1B, the mobile terminal 100 includes the OS 107, a store application 108, and two or more applications (an application A 109 and an application B 110).

The store application 108 is an application for downloading applications to the mobile terminal 100. When selecting a desired application with the store application 108 and performing a predetermined operation for downloading (tapping of a download button, password authentication, etc.), the user can download and install the selected application to the mobile terminal 100. The user can also activate an application installed in the mobile terminal 100 via the store application 108 by performing a predetermined operation (such as tapping of an "open" button) on a screen displayed by the store application 108.

Figure 5:
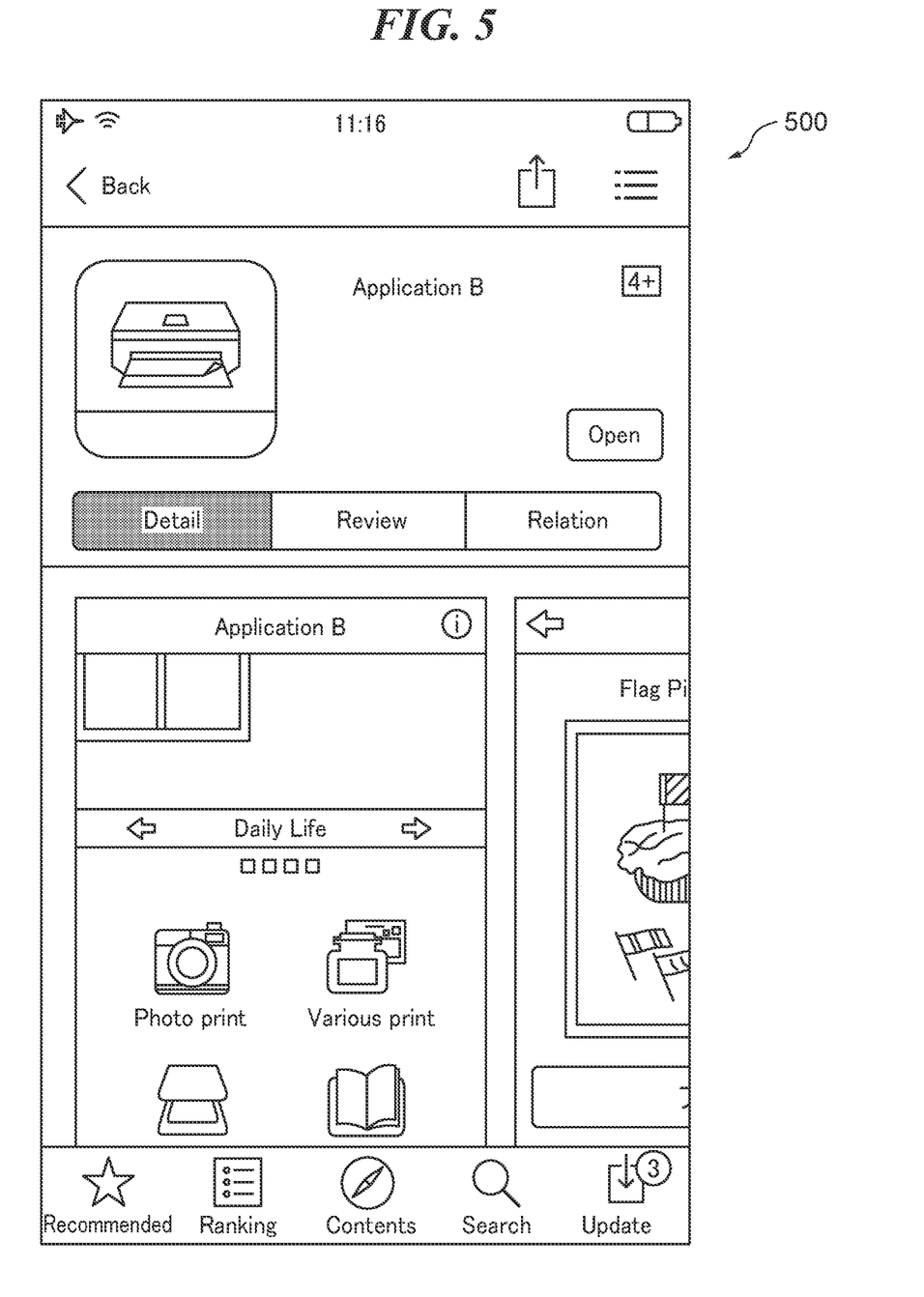
FIG. 5 is a view showing a UI screen displayed on a display unit in FIG. 1 by the store application.

FIG. 5 is a view showing a UI screen 500 displayed on the display unit 105 by the store application 108. The UI screen 500 is a screen for activating the application B 110 in a state where the application B 110 has already been installed in the mobile terminal 100. As described above, when the "open" button is tapped, the application B 110 is activated.

Figure 7:
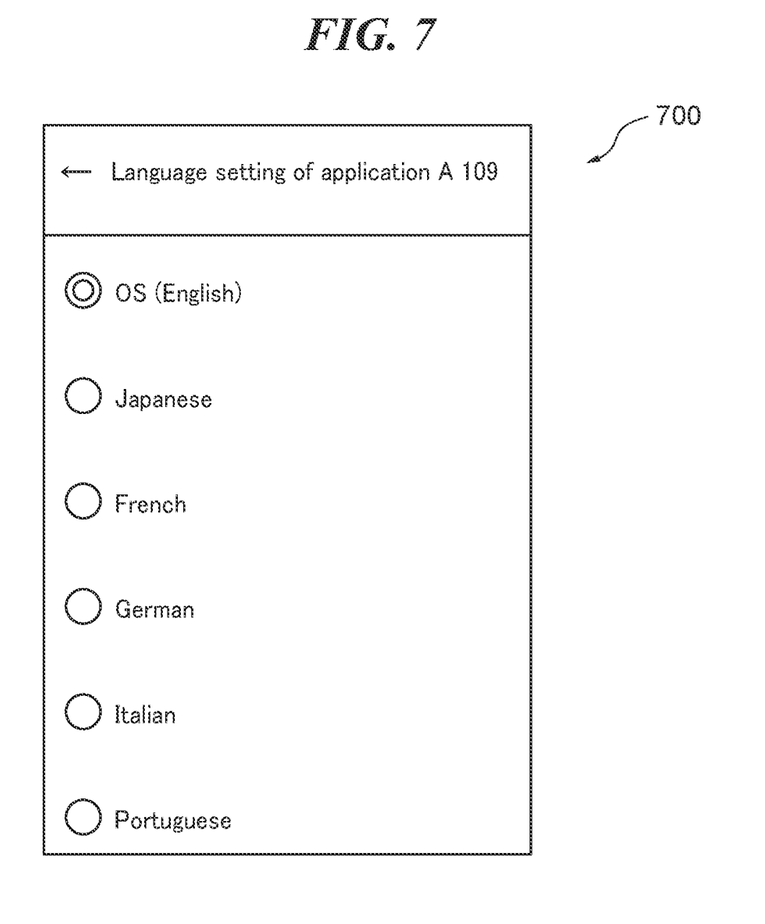
FIG. 7 is a view showing a UI screen for changing a language setting of the application A displayed on the display unit by an OS in FIG. 1.

FIG. 7 is a view showing a UI screen 700 displayed by the OS 107 on the display unit 105 for changing the language setting of the application A 109. The user can select the display language of the application A 109 using the UI screen 700 (second UI screen). The language setting of the application B 110 can also be changed by using a similar UI screen displayed by the OS 107. In particular, since a user who handles multiple languages may use different applications for respective language communities, it is important to enable selection of the display language for each application because it improves usability. In addition, when the user does not select the language settings of the application A 109 and the application B 110 using the UI screen 700 in FIG. 7, the language setting of the OS 107 is used as the language settings of the application A 109 and the application B 110.

The applications A 109 and the application B 110 are installed in the mobile terminal 100 by the store application 108 via the network etc. It should be noted that the application A 109 and the application B 110 may be installed from, for example, a storage medium that stores the applications, or may be preinstalled in the mobile terminal 100 at the time of arrival, without depending on the store application 108. In this embodiment, the application A 109 and the application B 110 are applications for transmitting a print job to a printer having a print function and causing the printer to execute printing based on the transmitted print job. The application A 109 and the application B 110 may have not only the function of causing the printer to execute printing but also other functions. For example, the applications may have a function of transmitting a scan job to the printer and causing the printer to perform scanning based on the transmitted scan job.

The store application 108, the application A 109, and the application B 110 operate via the OS 107. These software programs are stored in the storage device 106, are developed onto the memory 104, and are executed by the CPU 101.

In this embodiment, the application A 109 and the application B 110 operate cooperatively. Specifically, the application B 110 (a second application) operates using information generated by the application A 109 (a first application) installed in the mobile terminal 100. Hereinafter, the cooperative operation of the applications is referred to as application cooperation.

Figure 2A:
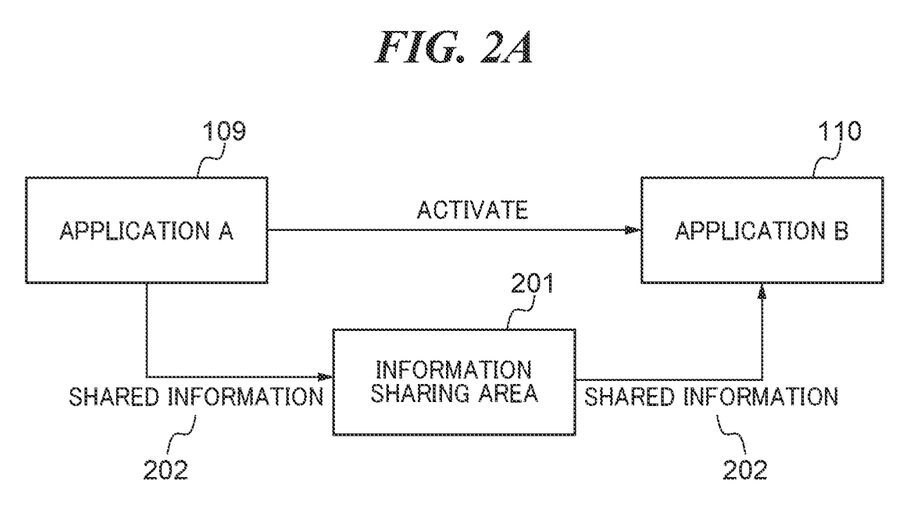
FIG. 2A, FIG. 2B, and FIG. 2C are views showing variations of application cooperation executed by an application A, an application B, and a store application in FIG. 1B.
Figure 2B:
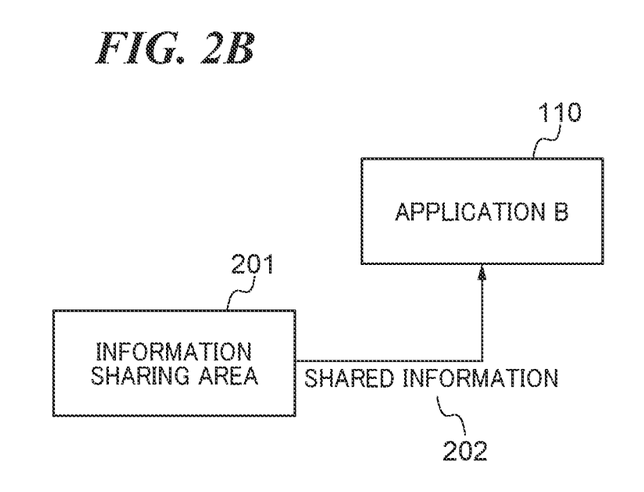
Figure 2C:
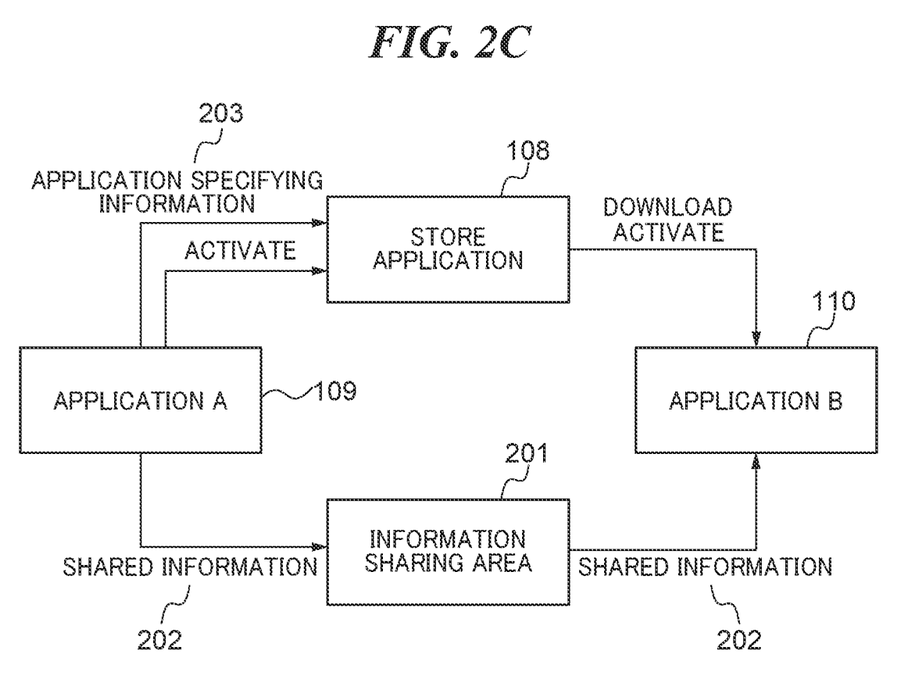

Examples of the application cooperation in use cases will now be described. FIG. 2A is a view showing the application cooperation when the application B 110 is cooperatively activated in a state where the application A 109 and the application B 110 have already been installed in the mobile terminal 100. Further, FIG. 2B is a view showing the application cooperation when the application B 110 is independently activated in a state where the application A 109 and the application B 110 have already been installed in the mobile terminal 100. Further, FIG. 2C is a view showing the application cooperation when the application B 110 is cooperatively activated in a state where the application B 110 is not installed in the mobile terminal 100.

The independent activation means that the application B 110 is activated by tapping an application icon in a home screen displayed by the OS 107 or by operating the screen displayed by the store application 108. The cooperative activation means that the application B 110 is activated by an operation to a screen displayed by an application other than the store application 108.

In this embodiment, the application B 110 is cooperatively activated by an operation to the screen displayed by the application A 109. Since information about a cooperation source (activation side) application (the application A 109) is given when a cooperation destination (cooperation side) application (the application B 110) is cooperatively activated, the CPU 101 can grasp whether the application B 110 is cooperatively activated.

The cooperative activation is performed to cause the cooperation destination application to execute a function that cannot be executed by the cooperation source application or to prompt a user to use the cooperation destination application when a process executed by the cooperation source application is handed over to the cooperation destination application.

Figure 6:
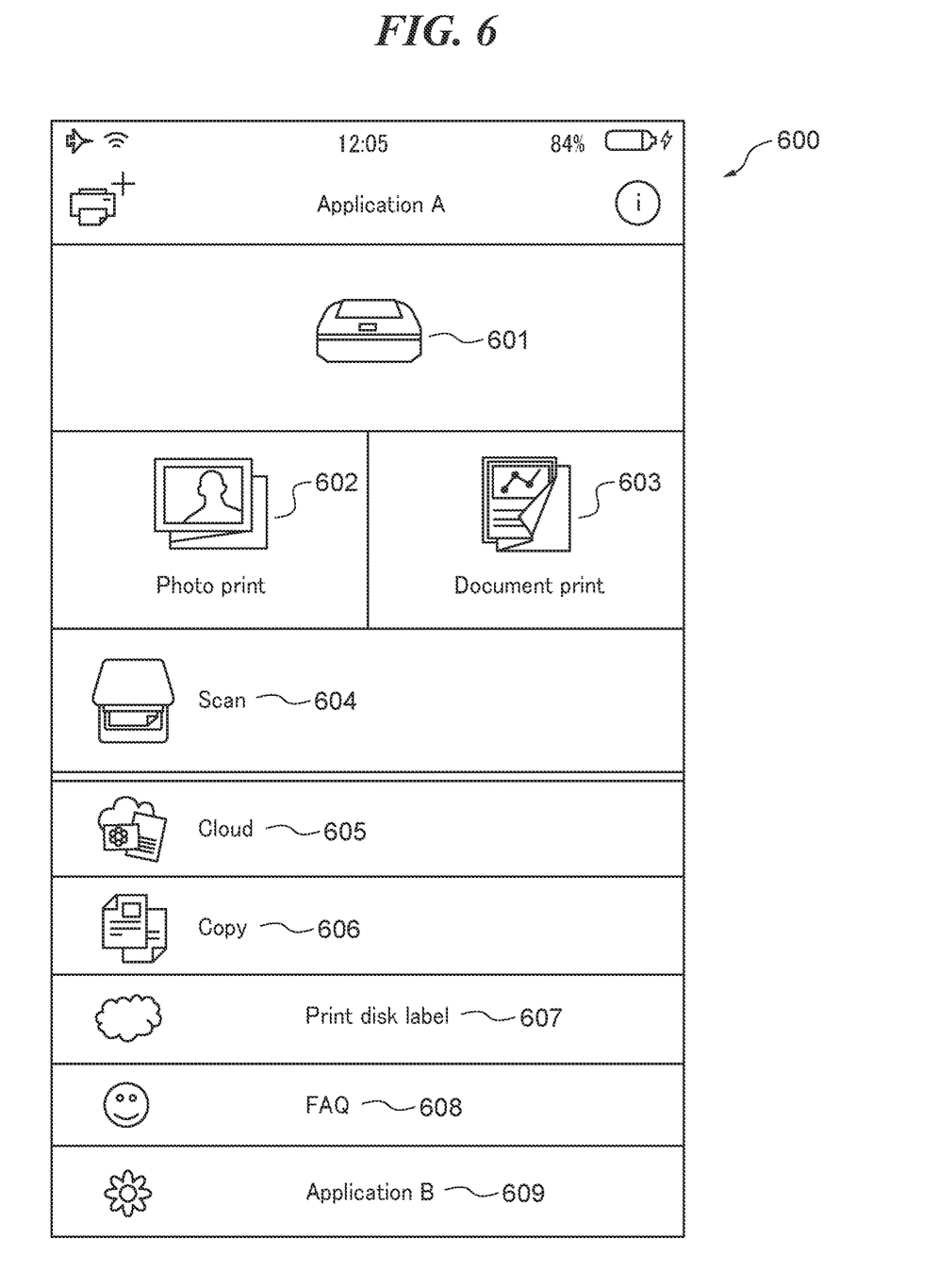
FIG. 6 is a view showing a UI screen displayed on the display unit by the application A.

FIG. 6 is a view showing a UI screen 600 displayed on the display unit 105 by the application A 109. As shown in FIG. 6, icons 601 to 609 are displayed on the UI screen 600 (a first UI screen).

The icon 601 indicates a printer that is registered to the application A 109. Registration of a printer to the application A 109 will be described later. The icons 602 and 603 are buttons used to transmit a print job to the printer registered to the application A 109 so as to print a photo or a document saved in the mobile terminal 100.

The icon 604 is a button used to transmit a scan job to the printer registered to the application A 109 so as to cause the printer to execute the scan job. The icon 605 is a button used to execute a cloud print function that causes the printer registered to the application A 109 to print image data stored in the external server.

The icon 606 is a button used to transmitting a copy job to the printer registered to the application A 109 to make a copy of an original. The icon 607 is a button used to transmit a print job to the printer and to cause the printer to print on a disc medium. For example, a disc-medium printing application other than the application A 109 may be required in order to print on a disk medium. In such a case, when receiving an operation to the icon 607 in a state where the disc-medium printing application is installed in the mobile terminal 100, the CPU 101 cooperatively activates the disc-medium printing application.

The icon 608 is a button used to launch a web page showing frequent questions about the application A 109 and answers thereto (e.g., how to operate the application A 109, etc.). The icon 609 is a button used to cooperatively activate the application B 110. When receiving an operation (a cooperative activation operation: an activation request for the application B 110) to the icon 609 in a state where the application B 110 is installed in the mobile terminal 100. The CPU 101 cooperatively activates the application B 110. For example, when a printer that is not supported by the application B 110 is registered to the application A 109, the CPU 101 may not accept the operation to the icon 609 (may be set to an operation unacceptable state). In the operation unacceptable state, the icon 609 may be indicated in gray or may not be indicated. That is, when the application B can share information with the application A 109, for example, when the applications are supplied from the same bender, the icon 609 is displayed on the UI screen 600 in an operation acceptable state.

Next, a use case in which the application B 110 is cooperatively activated via the application A109 in a state where the application A 109 and the application B 110 have already been installed in the mobile terminal 100 will be described with reference to FIG. 2A.

First, when receiving an operation to the icon 609, the CPU 101 (a storing unit) cooperatively activates the application B 110 and saves shared information 202 in an information sharing area 201. The CPU 101 can use the shared information 202 in both the operations of the application A 109 and the application B 110. The information sharing area 201 is a storage area in which the shared information 202 is stored. The information sharing area 201 may be, for example, a common folder that can be accessed during both the operations of the application A 109 and the operations of the application B 110, or may be a clipboard or a pasteboard managed by OS 107. The common folder may be, for example, an area included in a memory in the mobile terminal 100, such as the storage device 106, an area included in an external storage medium, such as an SD card or an HDD (not shown) that can be attached to the mobile terminal 100, or an area included in a network server. The form of the common folder is not limited as long as the common folder can store information usable in both the operation of the application A 109 and the operation of the application B 110. The shared information 202 may be deleted from the information sharing area 201, for example, at the timing when the shared information 202 is used or at the timing when the cooperatively activated application B 110 ends.

Then, when the application B 110 is cooperatively activated, the CPU 101 refers to the information sharing area 201 through the application B 110, obtains the shared information 202, and executes a process based on the shared information 202.

In this embodiment, the shared information 202 includes language information (a language setting) set in the application A. The language information may be a language code of an international standard defined in ISO639 or may be a character string or a numerical value that can be commonly understood by the application A 109 and the application B 110. As described above, in this embodiment, the application A 109 and the application B 110 include a print function that causes the printer communicable with the mobile terminal 100 to print an image. The application A 109 and the application B 110 can execute the print function by searching for printers (image forming apparatuses) around the mobile terminal 100 and registering a printer to print from among the searched printers.

The process of registering an image forming apparatus to an application is, in other words, a setting process of setting an apparatus communicable through the application. In this configuration, for example, information about a printer registered to the application A 109 (hereinafter referred to as registered information) is applicable as the shared information 202. The registered information is specifically, for example, a MAC address, a Bonjour name, an IP address, or the like.

Then, the CPU 101 executes a process to register the printer registered to the application A 109 to the application B 110 by the application B 110 as a process based on the shared information 202 in cooperatively activating the application B 110. With this configuration, for example, the CPU 101 can register the printer to the application B 110 without executing the process of searching for the printer by the application B 110. If the information sharing area 201 does not contain all the information necessary for registering the printer, at least a part of the information necessary for registering the printer may be applied as the shared information 202. Even in such a configuration, for example, it is possible to achieve an effect of suppressing the time required for the process of searching for the printer. As described above, the feature of this embodiment is that the language information of the cooperation source application A 109 is stored as the shared information 202 together with the printer information required for cooperation between the applications so that the language information can be referred to from the application B 110.

Next, behavior of the CPU 101 when the application B 110 is independently activated without through the application A 109 in a case where the application A 109 and the application B 110 have already installed in the mobile terminal 100 will be described with reference to FIG. 2B.

Similar to FIG. 2A, when receiving an operation to the icon 609, the CPU 101 starts the cooperative activation of the application B 110 and saves the shared information 202 into the information sharing area 201. In this embodiment, the CPU 101 refers to the information sharing area 201 even when the application B 110 is independently activated. When the shared information 202 is stored in the information sharing area 201, the CPU 101 obtains the shared information 202 and executes the process based on the shared information 202.

Thus, in this embodiment, the CPU 101 refers to the information sharing area 201 when the application B 110 is activated regardless of whether the application B 110 is independently activated or is cooperatively activated. With such a configuration, the application cooperation with the application A 109 can be executed regardless of whether the application B 110 is independently activated or is cooperatively activated.

Next, behavior of the CPU 101 when an operation to cooperatively activate the application B 110 is given to a screen displayed by the application A 109 in a case where the application B 110 is not installed in the mobile terminal 100 will be described using FIG. 2C.

Even if the operation to cooperatively activate the application B 110 is given to the screen displayed by the application A 109, if the application B 110 is not installed in the mobile terminal 100, the CPU 101 cannot naturally activate the application B 110. Further, it is generally necessary to use the store application 108 in order to install the application B 110 on the mobile terminal 100. Therefore, when the operation to cooperatively activate the application B 110 is given to the screen displayed by the application A 109 in a state where the application B 110 is not installed in the mobile terminal 100, the CPU 101 executes the following process.

First, when receiving the operation to the icon 609, the CPU 101 stores the shared information 202 into the information sharing area 201 by the application A109 before activating the store application 108. Next, the CPU 101 activates the store application 108.

It should be noted that the CPU 101 installs an application of a download target (hereinafter referred to as a target application) by the store application 108 by transmitting information capable of specifying the target application (hereinafter referred to as target application specifying information 203) to the activated store application 108. Thus, a UI screen for downloading the target application can be displayed on the display unit 105

Thus, in the use case in FIG. 2C, the CPU 101 transmits the application specifying information 203 in which the application B 110 is defined as the target application to the activated store application 108. As a result, the UI screen 500 (FIG. 5) for downloading the application B 110 is displayed on the display unit 105 by the store application 108. Thereafter, the CPU 101 receives an operation to the UI screen 500 from the user and downloads the application B 110.

When an operation to the icon 609 is accepted, the CPU 101 may automatically download the application B 110 without displaying the UI screen 500 in FIG. 5 and without accepting an operation to the UI screen 500 from the user. Thereafter, the CPU 101 accepts an operation to an application icon corresponding to the application B 110 on the home screen and an operation to the screen displayed by the store application 108 (an operation to the open button in FIG. 5).

Then, the CPU 101 activates the application B 110 in response to these operations and executes a process similar to the process shown in FIG. 2B. That is, the CPU 101 executes the process of the case where the application B 110 is independently activated.

As described above, when an operation to cooperatively activate the application B 110 is given to the UI screen 600 displayed by the application A 109 in a case where the application B 110 is not installed in the mobile terminal 100, the CPU 101 downloads the application B 110 by the store application 108. When the application B 110 is activated, the CPU 101 can cooperate the application A109 with the application B 110 using the shared information 202. In this embodiment, since the information sharing area 201 is referred to at the time of the independent activation as shown in FIG. 2B, even when the application B 110 is independently activated despite the operation for cooperatively activating the application B 110, the application B 110 can cooperate with the application A 109.

Figure 3:
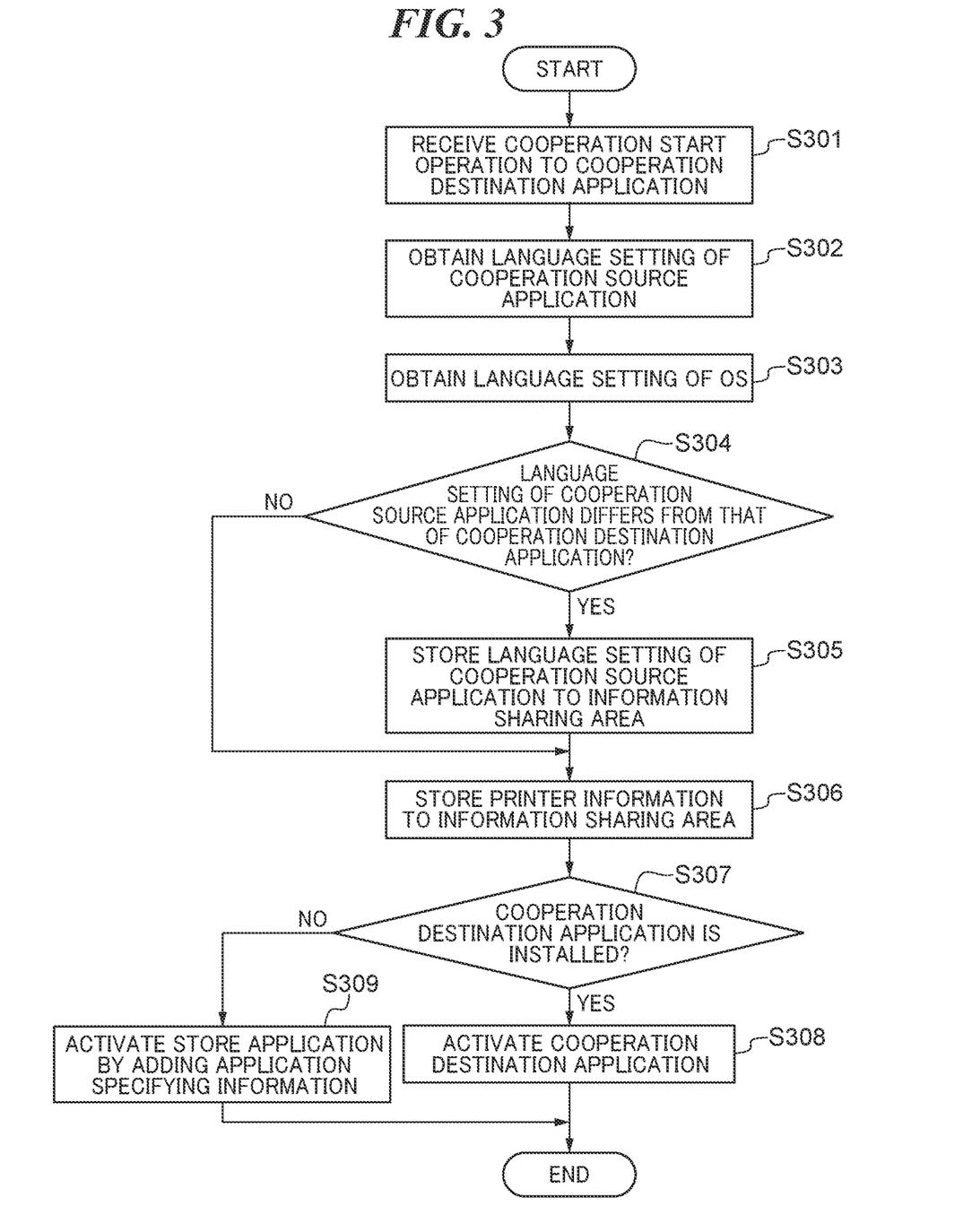
FIG. 3 is a flowchart showing an application cooperation process executed when a cooperative activation operation of the application B is received during an operation of the application A in the mobile terminal.

FIG. 3 is a flowchart showing an application cooperation process executed in the mobile terminal 100 when the cooperative activation operation for the application B 110 is given during the operation of the application A 109. It should be noted that the process shown in this flowchart is achieved by the CPU 101 reading a program corresponding to the application A 109 stored in the storage device 106, developing it to the memory 104, and executing the program.

Figure 4:
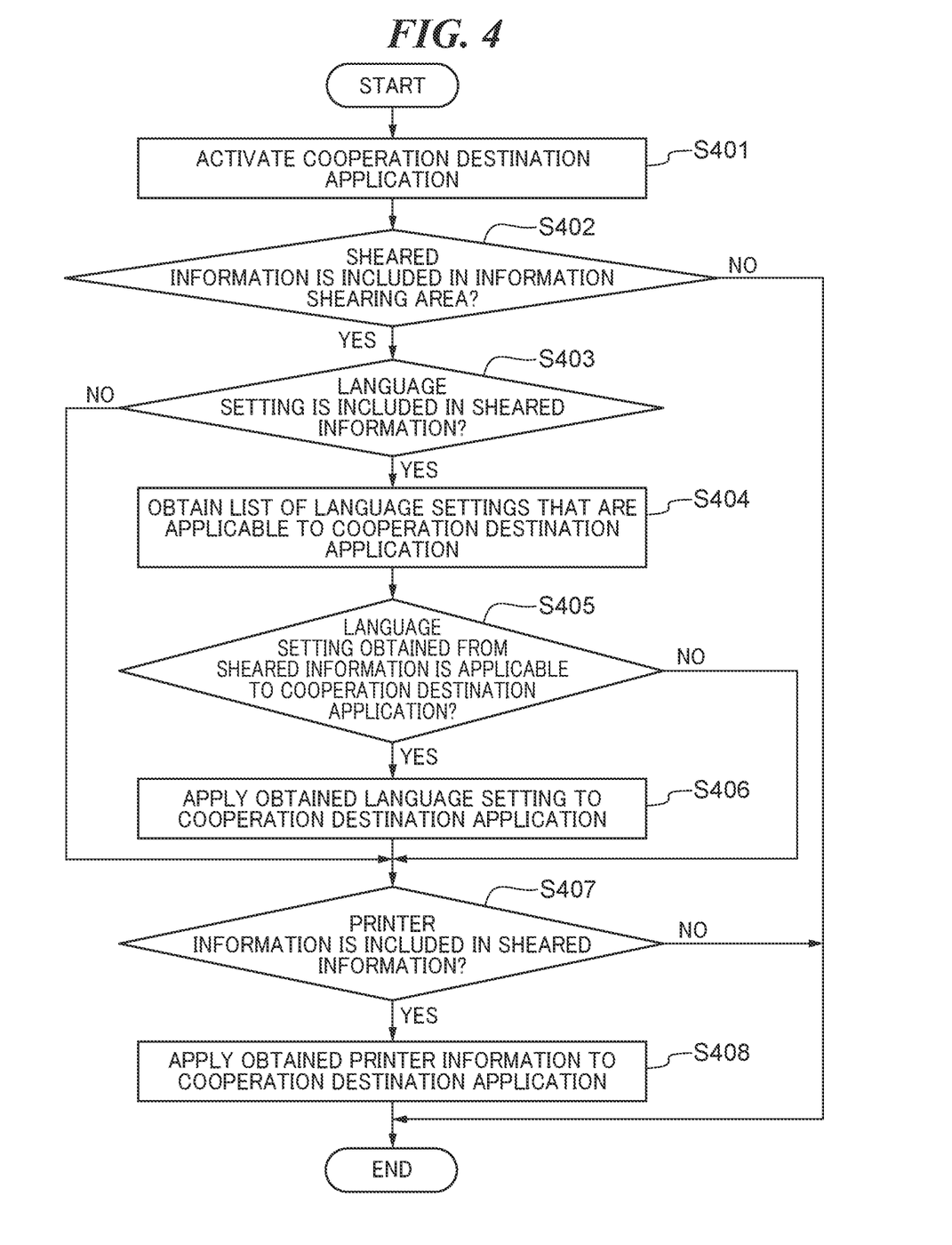
FIG. 4 is a flowchart showing a process after activating the application B in the mobile terminal.

The process shown in this flowchart is activated in a state where a screen for executing the function of the application A 109 is displayed on the display unit 105 by the application A 109. The "cooperation source application" in FIG. 4 is the application A in this embodiment, and the "cooperation destination application" in FIG. 4 is the application B in this embodiment.

First, in a step S301, the CPU 101 accepts a cooperative activation operation for an application B 110. Specifically, for example, an operation from the user to the icon 609 is accepted.

The CPU 101 obtains the language information (hereinafter referred to as "a language setting") set for the application A 109 and the language setting of the OS 107 in steps S302 and S303. It should be noted that default language settings of the application A 109 and the application B 110 match the language setting of the OS 107. As described above, since different language settings can be independently set the OS 107 and the application A 109, the language setting of the application A 109 set by the user may be different from the language setting of the OS 107.

Thus, in a step S304, the CPU 101 determines whether the language settings obtained in the steps S302 and S303 are different. When it is determined that the language setting of the application A 109 is different from the language setting of the OS 107 (YES in the step S304), the process proceeds to a step S305.

In the step S305, the CPU 101 stores the language information of the application A 109 into the information sharing area 201. In this embodiment, a language code defined by ISO639-1 is stored as a character string.

In the meantime, when the language setting of the application A 109 is identical to the language setting of the OS 107 (NO in the step S304), the process proceeds directly to a step S306 without performing the process in the step S306. This is because no special language setting process is performed by the user and there is no need to perform any special process when the language setting of the application A 109 is identical to the language setting of the OS 107.

Next, in the step S306, printer information is stored in the information sharing area 201 as information to be used for the cooperative activation in this embodiment. Here, the feature of this embodiment is that the printer information, which is necessarily used for the cooperative activation, and the language information that may be used are stored into the information sharing area 201.

In a step S307, the CPU 101 determines whether the application B 110 is installed in the mobile terminal 100. When determining that the application B 110 is installed in the mobile terminal 100 (YES in the step S307), the CPU 101 activates the application B 110 in a step S308.

After that, the CPU 101 executes a post-activation process for the application B 110 as shown in FIG. 4 described below. In the meantime, when determining that the application B 110 is not installed in the mobile terminal 100 (NO in the step S307), the CPU 101 activates the store application 108 in a step S309 in a known manner using, for example, a URL scheme. At this time, the store application 108 is activated while adding the application specifying information 203 for the store application 108 to specify the application B 110 to the URL scheme. Thus, a screen for downloading the application B 110 is displayed together with the activation of the store application 108. When receiving an operation for downloading the application B 110 from the user in this state, the CPU 101 can download and activate the application B 110. Thereafter, the CPU 101 executes the post-activation process for the application B 110 shown in FIG. 4 described later.

FIG. 4 is a flowchart showing the post-activation process for the application B 110 in the mobile terminal 100. It should be noted that the process of this flowchart is achieved realized by the CPU 101 reading a program corresponding to the application B 110 stored in the storage device 106, developing it onto the memory 104, and executing the program. As with FIG. 3, the "cooperation source application" in FIG. 4 is the application A and the "cooperation destination application" in FIG. 4 is the application B in this embodiment.

First, in a step S401, the CPU 101 activates the application B 110. The process in the step S401 is triggered by reception of the cooperative activation operation for the application B 110 via the application A 109, reception of the activation instruction to the application B 110 via the store application 108, reception of the activation instruction to the application B 110 via the home screen, or the like.

In a step S402, the CPU 101 determines whether the shared information 202 is included in the information sharing area 201. When the shared information 202 is not included (NO in the step S402), it is determined that the application B 110 is not expected to perform the cooperative operation with the application A 109, and thus the process is finished. In the meantime, when the shared information 202 is included (YES in the step S402), it is determined that the application B 110 is expected to perform the cooperative operation with the application A 109, and thus the process proceeds to steps from S403.

In the step S403, the CPU 101 checks the details of the shared information 202 that is determined to be included in the step S402. Specifically, it is determined whether the shared information 202 includes the language setting. This language setting corresponds to the language setting of the application A 109 stored in the step S305 in FIG. 3. As described above, since this language setting may not be included in the shared information 202, it is determination as described above in this step. When the shared information 202 includes the language setting (YES in the step S403), the process proceeds to steps from S404. In the meantime, when the shared information 202 does not include the language setting (NO in step S403), the process proceeds to a step S407.

In the step S404, the CPU 101 (an obtaining unit) obtains a list of language settings that can be set to the application B 110. In a step S405, the CPU 101 obtains the language setting from the shared information 202, refers to the list of the language settings obtained in the step S404, and determines whether the language setting obtained from the shared information 202 is applicable to the application B 110. This is because the language setting that can be used and displayed is generally different for each application, and thus the language setting of the application A 109 cannot always be used in the application B 110. If it is determined that it is applicable (YES in the step S405), the process proceeds to a step S406. In the meantime, when it is determined that the application is not applicable (NO in the step S405), the language setting of the application B 110 keeps the default setting, that is, the language setting of the OS 107 is left as the language setting of the application B 110, and the process proceeds to the step S407 without changing the language setting of the application B 110.

In the step S406, the CPU 101 (a change unit) applies the language setting obtained in the step S405 to the application B 110. According to the process up to this point, the language setting of the application A 109 is automatically applied to the application B 110, and the language setting at the time of cooperative activation becomes the same.

After the language setting of the application A is applied to the application B in the step S406, or when it is determined that the language setting of the application B 110 does not need to be changed in the step S403 or S405, the process proceeds to steps from S407.

In the step S407, the CPU 101 determines whether the printer information is included in the shared information 202. When it is determined that the printer information is included (YES in the step S407), the process proceeds to a step S408, and the printer information is applied to the application B 110. In the meantime, when it is determined that the printer information is not included (NO in the step S407), this process is terminated.

As described above, in this embodiment, when the CPU 101 receives the cooperative activation operation for the application B 110 via the application A 109 in the state where the application B 110 is not installed, the store application downloads and activates the application B 110 via the store application 108. At this time, since the application B 110 is activated from the store application 108, the CPU 101 determines that the activation of the application B 110 is the independent activation even though there is the cooperative activation operation for the application B 110. In this embodiment, the CPU 101 also refers to the information sharing area 201 during the independent activation. Therefore, even when the application B 110 is independently activated even though there is the cooperative activation operation for the application B 110, the language setting of the application A in the shared information 202 can be used and the language setting of the application B can be identical to that of the application A.

Other embodiments will now be described. In the above-described first embodiment, although the example in which the information sharing area 201 is always referred to when the application B 110 is cooperatively activated and when the application B 110 is independently activated has been described, the present invention is not limited to this configuration. For example, the language setting of the application A 109 may be different from the language setting of the application B 110. Therefore, a user may dare to set different languages to the application A 109 and the application B 110. In such a case, if the application A 109 and the application B 110 are cooperated and the language setting of the application A 109 is registered in the application B 110, the language setting of the application B 110 may be changed to what is not intended by the user.

Thus, when the language setting of the application B 110 is the default setting (i.e. the language setting of the OS 107) in activating the application B 110, the CPU 101 may control so as to apply the language setting of the application A 109 to the application B 110. In other words, when the language setting of the application B 110 is other than the default setting (i.e. the language setting of the OS 107) in activating the application B 110, the CPU 101 may control so as to keep the language setting of the application B 110 without changing it. This can reduce unintentional change of the language setting of the application B 110 of the user.

Further, although the configuration in which the application B 110 is downloaded by the store application 108 has been described in the above-described first embodiment, the present invention is not limited to this configuration. For example, the CPU 101 may download the application B 110 from a web page. In this case, the process of activating the store application 108 in the above-described embodiment is replaced by a process of activating a program for displaying the web page. When the program for displaying the web page is activated, the Web page for downloading the target application can be directly displayed by using the information about the target application. Alternatively, the CPU 101 may download the application B 110 by the store application 108 and then install the application B 110 by an installer. Further, the CPU 101 may download and install the application B 110 from a personal computer.

Further, although the application A 109 and the application B 110 are the print applications and the shared information 202 is the registered information in the above-described first embodiment, the present invention is not limited to this configuration. That is, the application A 109 and the application B 110 may be applications that can mutually share information, for example, may be applications supplied by the same vendor, and the functions thereof are not limited. Also, the content of the shared information 202 is not limited. For example, the application A 109 may be a camera application and the application B 110 may be a photo album generation application. In this case, for example, the shared information 202 may be image data or the like that can be arranged in a photo album. In this case, a specific process in the application cooperation is a process for displaying the image data in the shared information 202 as a thumbnail, a process for storing the shared information 202 into an area that can be referred to by the application B 110, or the like.

Although the device registered in the application A109 and the application B 110 is the printer in the first embodiment described above, the present invention is not limited to this configuration. That is, any device may be used as long as it can communicate with the mobile terminal 100 by the application A 109 or the application B 110.

Although the language setting of the application A 109 is stored in the information sharing area 201. when the operation for cooperatively activating the application B 110 is performed on the screen displayed by the application A 109, the present invention is not limited to this configuration. For example, the language setting of the application A 109 may be stored in the information sharing area 201 when the CPU 101 obtains the language setting of the application A 109 from the information sharing area 201 or when the language setting of the application A 109 is changed according to the user operation on the UI screen 700 in FIG. 7.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-127256, filed Aug. 9, 2022, which is hereby incorporated by reference herein in its entirety.

What is claimed is:

1. An information processing apparatus comprising:
   at least one processor; and
   at least one memory having stored thereon instructions which, when executed by the at least one processor, cause the at least one processor to function as:
   a display control unit configured to perform control to display a display item to accept an activation request for a second application on a screen of a first application that has already been installed in the information processing apparatus, wherein a language setting of the first application and a language setting of the second application can be changed individually after the respective applications are installed;

a storing unit configured to store the language setting of the first application into an information sharing area that can be accessed from the second application; and a change unit configured to change the language setting of the second application, based on the language setting of the first application stored in the sharing area, to a language indicated by the language setting of the first application stored in the sharing area in activating the second application in response to the activation request.

2. The information processing apparatus according to claim 1,
wherein the display item is set to an operation unacceptable state on the screen of the first application in a case where an apparatus that is not supported by the second application is registered in the first application as an apparatus communicable through the first application.

3. The information processing apparatus according to claim 1, wherein the first application can share information about an apparatus communicable through the first application with the second application.

4. The information processing apparatus according to claim 1, wherein the second application and the first application are supplied by a same vendor.

5. The information processing apparatus according to claim 1, wherein the storing unit stores the language setting of the first application into the information sharing area upon accepting the activation request in a case where the language setting of an operating system of the information processing apparatus is different from the language setting of the first application and does not store the language setting of the first application into the information sharing area upon accepting the activation request in a case where the language setting of the operating system is identical to the language setting of the first application.

6. The information processing apparatus according to claim 1, wherein the change unit keeps the language setting of the second application without changing it in a case where the language setting of the second application is other than a language setting of an operating system of the information processing apparatus in activating the second application in response to the activation request.

7. The information processing apparatus according to claim 1, wherein the storing unit stores the language setting of the first application into the information sharing area when the change unit obtains the language setting of the first application from the information sharing area.

8. The information processing apparatus according to claim 1, wherein the display control unit further performs control to display a User Interface (UI) screen of the first application on which a user operation to change the language setting of the first application is accepted,
wherein the storing unit stores the language setting of the first application into the information sharing area when the language setting of the first application is changed in response to a change operation by a user on the second UI screen.

9. The information processing apparatus according to claim 1, wherein the instructions further cause the at least one processor to function as an obtaining unit configured to obtain a list of language settings that can be set to the second application;
wherein the change unit changes the language setting of the second application to the language indicated by the language setting of the first application stored in the sharing area in a case where the language indicated by the language setting of the first application stored in the sharing area is included in the list of the language settings and does not change the language setting of the second application in a case where the language indicated by the language setting of the first application stored in the sharing area is not included in the list of the language settings.

10. The information processing apparatus according to claim 1, wherein the storing unit stores the language setting of the first application together with shared information different from the language setting into the information sharing area upon accepting the activation request.

11. The information processing apparatus according to claim 10, wherein the shared information is at least one of information for communication with an apparatus communicable through the first application, information about a printer registered in the first application, and image data.

12. A control method for an information processing apparatus the control method comprising:
displaying a display item to accept an activation request for a second application on a screen of a first application that has already been installed in the information processing apparatus, wherein a language setting of the first application and a language setting of the second application can be changed individually after the respective applications are installed;
storing the language setting of the first application into an information sharing area that can be accessed from the second application; and
changing the language setting of the second application, based on the language setting of the first application stored in the sharing area, to a language indicated by the language setting of the first application stored in the sharing area in activating the second application in response to the activation request.

13. A non-transitory computer-readable storage medium storing a control program causing a computer to execute a control method for an information processing apparatus, the control method comprising:
displaying a display item to accept an activation request for a second application on a screen of a first application that has already been installed in the information processing apparatus, wherein a language setting of the first application and a language setting of the second application can be changed individually after the respective applications are installed;
storing the language setting of the first application into an information sharing area that can be accessed from the second application; and
changing the language setting of the second application, based on the language setting of the first application stored in the sharing area, to a language indicated by the language setting of the first application stored in the sharing area in activating the second application in response to the activation request.

14. A non-transitory computer-readable storage medium storing one or more programs of a first application configured to cause one or more computers to function as:
a display control unit configured to perform control to display a display item to accept an activation request for a second application on a screen of the first application that has already been installed in an information processing apparatus, wherein a language setting of the first application and a language setting of the second application can be changed individually after the respective applications are installed;
a control unit configured to perform control to store the language setting of the first application into an information sharing area that can be accessed from the second application upon accepting the activation request in a case where the language setting of an operating system of the information processing apparatus is different from the language setting of the first application, while not storing the language setting of the first application into the information sharing area upon accepting the activation request in a case where the language setting of the operating system is identical to the language setting of the first application.

15. The storage medium according to claim 14, wherein the control unit performs control to store the language setting of the first application together with shared information different from the language setting into the information sharing area upon accepting the activation request in a case where the language setting of the operating system of the information processing apparatus is different from the language setting of the first application.

16. The storage medium according to claim 15, wherein the shared information is at least one of information for communication with an apparatus communicable through the first application, information about a printer registered in the first application, and image data.

17. A control method for an information processing apparatus, the control method comprising:
    displaying a display item to accept an activation request for a second application on a screen of a first application that has already been installed in an information processing apparatus, wherein a language setting of the first application and a language setting of the second application can be changed individually after the respective applications are installed; and
    performing control to store the language setting of the first application into an information sharing area that can be accessed from the second application upon accepting the activation request in a case where the language setting of an operating system of the information processing apparatus is different from the language setting of the first application, while not storing the language setting of the first application into the information sharing area upon accepting the activation request in a case where the language setting of the operating system is identical to the language setting of the first application.

18. An information processing apparatus comprising:
    at least one processor; and
    at least one memory having stored thereon instructions which, when executed by the processor, cause the at least one processor to function as:
        a display control unit configured to perform control to display a display item to accept an activation request for a second application on a screen of a first application that has already been installed in the information processing apparatus, wherein a language setting of the first application and a language setting of the second application can be changed individually after the respective applications are installed; and
        a control unit configured to perform control to store the language setting of the first application into an information sharing area that can be accessed from the second application upon accepting the activation request in a case where the language setting of an operating system of the information processing apparatus is different from the language setting of the first application, while not storing the language setting of the first application into the information sharing area upon accepting the activation request in a case where the language setting of the operating system is identical to the language setting of the first application.

* * * * *